United States Patent Office 2,729,852
Patented Jan. 10, 1956

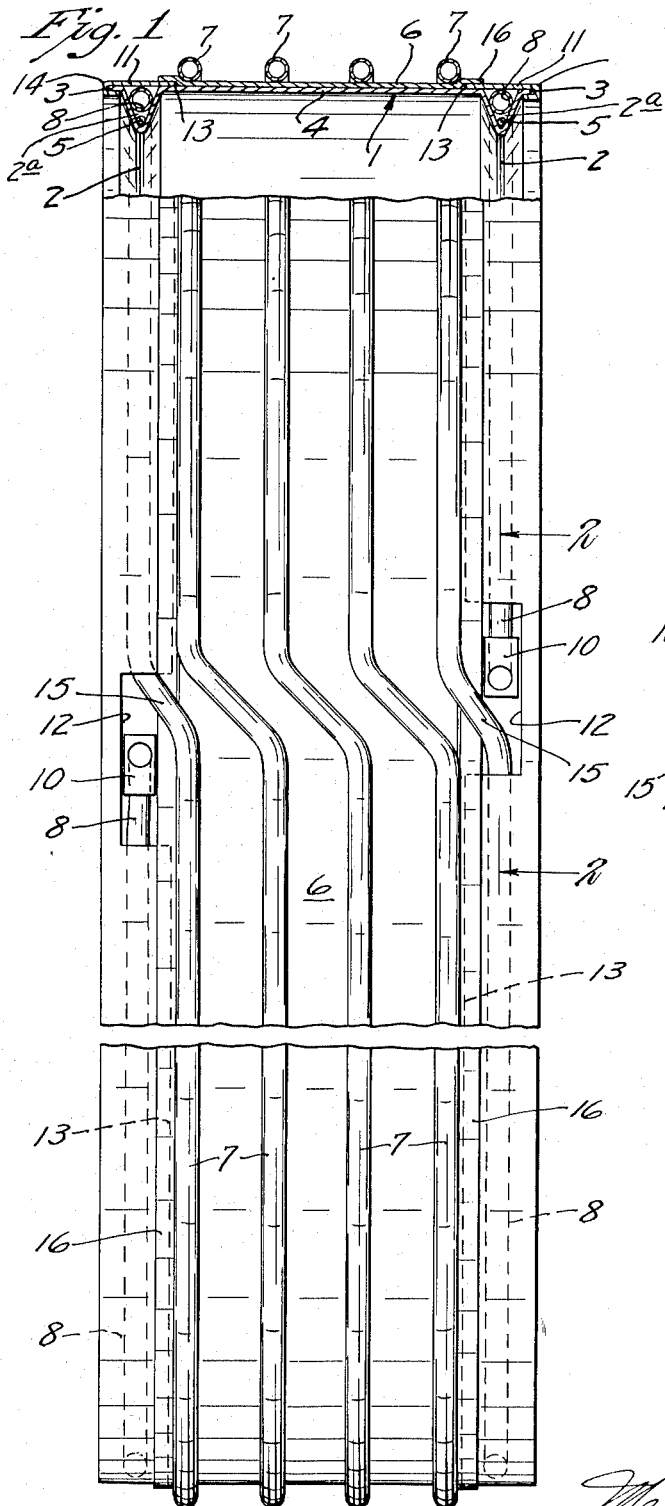

2,729,852

MOLD FOR RETREADING PNEUMATIC TIRE CASINGS AND METHOD OF FORMING SAME

Earle W. Hawkinson, Minneapolis, Minn., assignor to Paul E. Hawkinson Company, Minneapolis, Minn., a corporation of Minnesota Application October 10, 1952, Serial No. 314,125

1 Claim. (Cl. 18—18)

My present invention relates to tire retreading equipment and more particularly to improvements in light weight endless sheet metal tire retreading matrices of the type disclosed in U. S. Patents 1,917,262 and 2,339,696.

Molds of the above type are provided with integrally formed radially inwardly projecting continuous V-shaped tread material confining flanges adjacent their opposite side edges. Recently, there has been a tendency in some cases to extend, or radially deepen, these flanges so as to overlap somewhat the thick shoulders on opposite sides of the worn tread of a pneumatic tire. I have observed that as these flanges are deepened or extended, that insufficient heat has been imparted thereto for proper vulcanization. The primary object of my invention is the provision of novel means for imparting heat to the radially innermost portions of the extended flanges, in molds or matrices of the above-identified type.

A still further object of my invention is the provision of novel heating means for sheet metal molds of the above character which molds are provided with endless reinforcing jackets around their external peripheral surfaces.

A still further object of my invention is the provision of molds or matrices of the type immediately above described which are inexpensive to produce, and which the heating means do not add weight to the mold, and which molds are durable in use and foolproof in operation.

The above and still further objects of my invention will become apparent from the following detailed specification, appended claim and attached drawings.

Referring to the drawings wherein like characters indicate like parts throughout the several views:

Fig. 1 is a view in plan, some parts broken away and some parts shown in transverse section; and Fig. 2 is an enlarged fragmentary detail taken substantially on the line 2—2 of Fig. 1.

Referring with greater particularity to the drawings, the numeral 1 indicates a cylinder-like matrix formed from sheet metal and having generally V-shaped radially inwardly projecting parallel tread material confining flanges 2 adjacent its side edges 3. As shown, the side edges 3 are in the nature of endless cylinder-like lips lying in the same plane as the cylindrical portion 4 intermediate the confining flanges 2.

Endless wires 5 are preferably inserted in the bottoms of the cavities 2a of the confining flanges 2 for the purpose of reinforcement. Thereafter, an endless reinforcing band 6 is wrapped tightly about the peripheral surface of the matrix 1 intermediate the confining flanges 2. U. S. Patent 2,331,679 discloses a method of applying the band 6. Next, I apply an endless tubular heating conduit 7 around the peripheral surface of the matrix 1. As shown, one convolution at opposite ends of the conduit 7 is nestingly received totally within the cavity 2a provided by the confining flanges 2. These convolutions are identified by the numeral 8. However, the intermediate portion of the conduit 7 is wound generally spirally about the peripheral surface of the reinforcing band 6.

As shown, the opposite ends of the conduit 7 are bent to project radially of the matrix 1 and extend radially outwardly of the cavities 2a, as indicated at 9, where they are provided with enlarged heads 10 which act as inlet and outlet fittings. Next, I form opposed annular reinforcing band sections 11 which have inwardly opening notches 12 along their inner edges 13 and U-shaped outer edge portions 14. As shown, the band sections 11 are caused to overlie the cavities 2a of the confining flanges 2 and conceal same and the conduit portions 8 therein. The notches 12 are caused to register and receive therein not only the heads 10 but also the angularly disposed portions 15 of the conduit 7 where same enter and leave the cavities 2a. It will be noted that the inner edge portions 13 of the band sections 11 have overlapping relationship with the opposite edges 16 of the band 6. The band 6 and band sections 11 are rigidly secured together at the point of overlapping by spot-welding or the like. Furthermore, the U-shaped outer edge portions 14 of the band sections 11 are caused to tightly embrace the lip-like edge portions 3 of the matrix 1, whereby to positively hold the matrix against lateral expansion.

It will be readily appreciated that by the above arrangement of parts, adequate heat is imparted not only to the radially innermost portions of the confining flanges 2, but also to the mold cavity intermediate said flanges 2.

What I claim is:

A device for applying treads to pneumatic tire casings, said device comprising an integral cylinder-like matrix formed from sheet metal and having its opposite side edge portions extending radially inwardly defining unbroken, unobstructed parallel continuous V-shaped tread material confining flanges of uniform size and shape throughout the full peripheral extent thereof, a reinforcing band circumferentially about the external peripheral surface of said matrix between said confining flanges, an endless generally spirally-wound tubular heating conduit about said matrix, substantially one convolution at opposite ends of said conduit being nestingly received totally within each of said V-shaped confining flanges, the convolutions of said coil intermediate said flanges being secured to the radial outer surface of said reinforcing band, the opposite ends of said tubular heating conduit projecting radially outwardly of said matrix and terminating radially outwardly of said flanges in enlarged heads providing respectively inlet and outlet fittings, and a pair of opposed annular reinforcing band sections encompassing the marginal edges of the matrix and overlying said confining flanges and the tubular conduit therein, the opposed axial inner edges of said sections being in overlapping relationship with the outer axial edges of said reinforcing band and rigidly secured thereto, and the outer axial edge portions of said sections being rigidly secured to the outer axial marginal edge portion of said matrix to thereby positively hold the matrix against lateral expansion, each of said sections being provided with an inwardly opening notch at its inner edge through which one of said fittings and said conduit extend.

References Cited in the file of this patent

UNITED STATES PATENTS

| 2,155,906 | Rihn et al. | Apr. 25, 1939 |
| 2,276,811 | Ward | Mar. 17, 1942 |
| 2,331,680 | Hawkinson | Oct. 12, 1943 |
| 2,339,696 | Hawkinson | Jan. 18, 1944 |
| 2,457,370 | Hawkinson | Dec. 28, 1948 |
| 2,469,828 | Johnson | May 10, 1949 |
| 2,558,345 | Dickman | June 26, 1951 |
| 2,610,357 | Hawkinson | Sept. 16, 1952 |
| 2,644,984 | Crooker | July 14, 1953 |